US012722214B2

(12) United States Patent
Jiang et al.

(10) Patent No.: US 12,722,214 B2
(45) Date of Patent: Sep. 1, 2026

(54) CRESCENT-EDGE HARD ALLOY MILLING CUTTER AND PARAMETER DESIGN METHOD THEREOF

(71) Applicant: Harbin University of Science and Technology, Harbin (CN)

(72) Inventors: Zhipeng Jiang, Harbin (CN); Xianli Liu, Harbin (CN); Caixu Yue, Harbin (CN); Yiwen Wang, Harbin (CN); Anshan Zhang, Harbin (CN); Rongyi Li, Harbin (CN); Youheng Shi, Harbin (CN); Desheng Hu, Harbin (CN); Zunyan Ma, Harbin (CN)

(73) Assignee: Harbin University of Science and Technology, Harbin (CN)

( * ) Notice: Subject to any disclaimer, the term of this patent is extended or adjusted under 35 U.S.C. 154(b) by 0 days.

(21) Appl. No.: 19/258,919

(22) Filed: Jul. 3, 2025

(65) Prior Publication Data

US 2026/0070134 A1 Mar. 12, 2026

(30) Foreign Application Priority Data

Sep. 6, 2024 (CN) ........................ 202411248983.0

(51) Int. Cl.
*B23C 5/04* (2006.01)
*B23C 5/00* (2006.01)
(Continued)

(52) U.S. Cl.
CPC ................ *B23C 5/04* (2013.01); *B23C 5/006* (2013.01); *B23C 5/10* (2013.01);
(Continued)

(58) Field of Classification Search
CPC ..... B23C 5/04; B23C 2210/0407; B23C 5/10; B23C 5/006; G06F 17/18; G06F 30/17;
(Continued)

(56) References Cited

U.S. PATENT DOCUMENTS 5,186,739 A * 2/1993 Isobe ...................... B23B 51/00 428/560
2018/0133811 A1* 5/2018 Baskut ...................... B23C 5/10
(Continued)

FOREIGN PATENT DOCUMENTS

CN 207577516 U 7/2018
CN 115229254 A 10/2022
(Continued)

*Primary Examiner* — Sara Addisu
(74) *Attorney, Agent, or Firm* — Bayramoglu Law Offices LLC

(57) ABSTRACT

A crescent-edge hard alloy milling cutter and a parameter design method thereof relate to the technical field of milling cutter design. The crescent-edge hard alloy milling cutter includes a front cutter head, a peripheral blade portion, and a shank portion, where a plurality of crescent peripheral blades extending helically toward the front cutter head are provided on the peripheral blade portion; a plurality of crescent cutting blades are provided on the front cutter head; and the crescent cutting blade and the crescent peripheral blade are in arc transition in pairs. With the design of the crescent cutting blade and the crescent peripheral blade, the crescent-edge hard alloy milling cutter has excellent cutting performance. Moreover, the crescent cutting blade and the crescent peripheral blade are in the arc transition, ensuring smoothness of the milling cutter to cut a metal workpiece.

6 Claims, 5 Drawing Sheets

(51) Int. Cl.
*B23C 5/10* (2006.01)
*G06F 30/17* (2020.01)
*G06F 111/10* (2020.01)

(52) U.S. Cl.
CPC ...... *B23C 2210/0407* (2013.01); *G06F 30/17* (2020.01); *G06F 2111/10* (2020.01)

(58) Field of Classification Search
CPC ...... G06F 30/20; G06F 30/23; G06F 2111/06; G06F 2111/10
See application file for complete search history.

(56) References Cited

U.S. PATENT DOCUMENTS

| | | | | |
|---|---|---|---|---|
| 2023/0241691 | A1* | 8/2023 | Watanobe | B23B 27/148 407/119 |
| 2024/0123521 | A1* | 4/2024 | Kawaguchi | B23C 5/10 |
| 2025/0128340 | A1* | 4/2025 | Pittala | B23C 5/10 |

FOREIGN PATENT DOCUMENTS

| | | | | |
|---|---|---|---|---|
| CN | 115464195 | A | 12/2022 | |
| CN | 116551046 | A | 8/2023 | |
| CN | 117733221 | A | 3/2024 | |
| EP | 3744452 | A1 * | 12/2020 | B23C 5/28 |
| JP | 2021010957 | A | 2/2021 | |
| WO | 2019047557 | A1 | 3/2019 | |

* cited by examiner

CRESCENT-EDGE HARD ALLOY MILLING CUTTER AND PARAMETER DESIGN METHOD THEREOF

CROSS REFERENCE TO THE RELATED APPLICATIONS

This application is based upon and claims priority to Chinese Patent Application No. 202411248983.0, filed on Sep. 6, 2024, the entire contents of which are incorporated herein by reference.

TECHNICAL FIELD

The present disclosure relates to the technical field of milling cutter design, and in particular to a crescent-edge hard alloy milling cutter and a parameter design method thereof.

BACKGROUND

In the aerospace field, extremely stringent requirements are imposed on the machining efficiency, quality, and tool life. The hard alloy end mill serves as an important tool to cut metal, and its performance is directly associated with the machining effect. Therefore, a hard alloy end mill with superb performance is particularly important to machine key aerospace components.

The information disclosed in the background is merely intended to facilitate the comprehension to the background of the present disclosure, and thus may include information that does not constitute the prior art known to those of ordinary skill in the art.

SUMMARY

An objective of the present disclosure is to provide a crescent-edge hard alloy milling cutter and a parameter design method thereof, to solve the problem in the background.

In order to achieve the above objective, the present disclosure provides the following technical solutions:

The present disclosure provides a crescent-edge hard alloy milling cutter, including a front cutter head, a peripheral blade portion, and a shank portion, where a plurality of crescent peripheral blades extending helically toward the front cutter head are provided on the peripheral blade portion; a plurality of crescent cutting blades are provided on the front cutter head; and the crescent cutting blade and the crescent peripheral blade are in arc transition in pairs.

Further, an end chip flute is formed between adjacent crescent cutting blades; two sides of the crescent cutting blade are respectively connected to a first flank face and a rake face of a curved surface structure; a side of the rake face away from the crescent cutting blade is connected to the end chip flute; and a side of the first flank face away from the crescent cutting blade is connected to another end chip flute through a second flank face.

Further, a peripheral-blade chip flute is formed between adjacent crescent peripheral blades; two sides of the crescent peripheral blade are respectively connected to a peripheral-blade rake face and a first peripheral-blade flank face; a side of the peripheral-blade rake face away from the crescent peripheral blade is connected to the peripheral-blade chip flute; and a side of the first peripheral-blade flank face away from the crescent peripheral blade is connected to another peripheral-blade chip flute through a second peripheral-blade flank face.

Further, with a center of the front cutter head as an origin O, a plane-coordinate system XOY flush with a transverse section of the front cutter head is established; and in an initial state, a curvilinear equation of the crescent cutting blade satisfies the following relation:

$$\begin{cases} x(\theta) = \frac{R}{2} \times (\cos\theta + 1) + B1 \times \frac{\theta}{\pi} \\ y(\theta) = A1 \times \sin\theta \end{cases}$$

where θ is a variation parameter of a curve of the crescent cutting blade, and $\theta \in [0, \pi]$; R is a radius of the front cutter head, and $R \in [1\text{ mm}, 25\text{ mm}]$; A1 is an amplitude of an edge of the crescent cutting blade, and in unit of a micron, and $A1 \in [0.2,5]$; and B1 is a distance from a starting point of the crescent cutting blade to a center of the milling cutter, and $B1 \in [0.1R, 0.5R]$; and the plurality of crescent cutting blades in the initial state are respectively rotated by different angles to form a plurality of different crescent cutting blades; and a curvilinear equation of the finally formed crescent cutting blade satisfies the following relation:

$$\begin{pmatrix} x(\theta)_k \\ y(\theta)_k \end{pmatrix} = \begin{pmatrix} \cos\theta_k & -\sin\theta_k \\ \sin\theta_k & \cos\theta_k \end{pmatrix} \begin{pmatrix} x(\theta) \\ y(\theta) \end{pmatrix}$$

where k represents serial numbers of the different crescent cutting blades, and k=1, 2, 3, . . . , N, N representing a total number of crescent cutting blades on the front cutter head, $$N \geq 2, N \in N^+, \text{ and } \theta_k = \frac{2\pi k}{N}.$$

Further, based on the plane-coordinate system XOY, with an axis of the milling cutter as a Z axis, a three-dimensional (3D) coordinate system O-XYZ is established; the Z axis takes a direction pointing to the front cutter head as a positive direction; and a curvilinear equation of the crescent peripheral blade satisfies the following relation:

$$\begin{cases} x(\theta 1) = \left(\frac{R}{2} + A\sin(B \times \theta 1)\right) \times \cos\theta 1 \\ y(\theta 1) = \left(\frac{R}{2} + A\sin(B \times \theta 1)\right) \times \sin\theta 1 \\ z(\theta 1) = \frac{M \times \theta 1}{2\pi} \end{cases}$$

where θ1 is a variation parameter of a curve of the crescent peripheral blade, and $$\theta 1 \in \left[0, \frac{2\pi H}{M}\right];$$

H is a length of the crescent peripheral blade, and $H \in [5R, 6R]$; A is an amplitude of an edge of the crescent peripheral blade, is used to determine a height of a crescent shape of the crescent peripheral blade, and is in unit of a micron, and $A \in [0.1, 0.5]$; B is a frequency of the crescent peripheral blade, and is used to determine a number of times that the crescent shape of the crescent peripheral blade appears in one helix period, and $$B \in \left[\sqrt{\frac{2\pi^2 R^2 + M^2}{5}}, 20\sqrt{4\pi^2 R^2 + M}\right];$$

and M is a pitch, and is used to determine an ascending height of a helix, and $M \in [0.72\pi R, 3.46\pi R]$.

Further, a rake angle changing continuously along a radial direction of the front cutter head is formed between the rake face and the crescent cutting blade; the rake angle is minimum at the center of the milling cutter; and the rake angle increases first and then decreases along the radial direction of the front cutter head.

Further, the rake angle is maximum at a predetermined position R' in the radius of the front cutter head; in a range of 0-R', the rake angle increases along the radial direction of the front cutter head in a manner that an increment decreases progressively; and in a range of R'-R, the rake angle decreases along the radial direction of the front cutter head in a manner that a decrement increases progressively, and $$R' \in \left(\frac{R}{2}, \frac{4R}{5}\right).$$

The present disclosure provides a parameter design method, applied to design a parameter of the crescent-edge hard alloy milling cutter, and including the following steps:

S1, establishing a mathematical relation among the amplitude, the frequency, the pitch, a cutting force, a cutting temperature, and chatter, specifically:

$$\begin{cases} V(A, B, M) = c1 \times A^{a1} \times B^{b1} \times M^{m1} \\ F(A, B, M) = c2 \times A^{a2} \times B^{b2} \times M^{m2} \\ T(A, B, M) = c3 \times A^{a3} \times B^{b3} \times M^{m3} \end{cases}$$

where V(A,B,M) represents the chatter under the amplitude A, the frequency B and the pitch M, F(A,B,M) represents the cutting force under the amplitude A, the frequency B and the pitch M, T(A,B,M) represents the cutting temperature under the amplitude A, the frequency B and the pitch M, and a1,b1,c1,m1,a2,b2,c2, m2,a3,b3,c3,m3 each are a to-be-determined coefficient;

S2, establishing a working model for a tool and a workpiece; simulating a cutting process at different amplitudes A, different frequencies B and different pitches M while a material characteristic of the workpiece is determined; acquiring chatter data, cutting force data and cutting temperature data at the different amplitudes A, the different frequencies B and the different pitches M through simulated analysis; and determining the to-be-determined coefficient a1,b1,c1,m1,a2,b2,c2,m2, a3,b3,c3,m3 based on regression analysis; and S3, defining a generalized objective function, and seeking an optimal solution for the amplitude A, the frequency B and the pitch M based on a multi-objective optimization algorithm to minimize the generalized objective function;

where the generalized objective function is expressed as:

$$\min f(A, B, M) = [V(A, B, M), F(A, B, M), T(A, B, M)]$$

where the optimal solution for the amplitude A, the frequency B and the pitch M is calibrated as an amplitude A*, a frequency B* and a pitch M*; and when the following condition is satisfied, the amplitude A*, the frequency B* and the pitch M* are taken as the optimal solution of the generalized objective function:

there is no solution satisfying:

$$\begin{cases} V(A, B, M) \leq V(A^*, B^*, M^*) \\ F(A, B, M) \leq F(A^*, B^*, M^*), \\ T(A, B, M) \leq T(A^*, B^*, M^*) \end{cases}$$

and there is at least a solution satisfying:

$$\begin{cases} V(A, B, M) < V(A^*, B^*, M^*) \\ F(A, B, M) < F(A^*, B^*, M^*). \\ T(A, B, M) < T(A^*, B^*, M^*) \end{cases}$$

Compared with the prior art, the present disclosure has the following beneficial effects:

According to the crescent-edge hard alloy milling cutter and the parameter design method thereof provided by the present disclosure, with the design of the crescent cutting blade and the crescent peripheral blade, the present disclosure ensures excellent cutting performance of the milling cutter. Moreover, since the crescent cutting blade and the crescent peripheral blade are in arc transition, the present disclosure ensures the smoothness of the milling cutter to cut the metal workpiece, improving the machining effect of the milling cutter for the key aerospace component.

Figure 1:
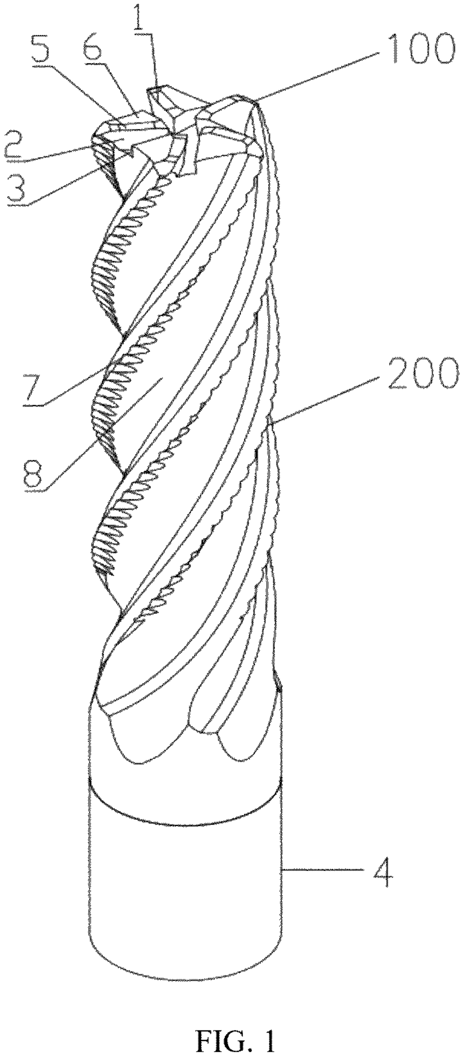
FIG. 1 is a 3D schematic structural view of a milling cutter according to the present disclosure.

Reference numerals: 100: front cutter head, 200: peripheral blade portion, 1: crescent cutting blade, 2: rake face, 3: end chip flute, 4: shank portion, 5: first flank face, 6: second flank face, 7: crescent peripheral blade, 8: peripheral-blade chip flute, 9: first peripheral-blade flank face, 10: second peripheral-blade flank face, and 11: peripheral-blade rake face.

DETAILED DESCRIPTION OF THE EMBODIMENTS

In order to make the objectives, technical solutions, and advantages of the present disclosure clearer, the present disclosure is further described in detail below with reference to specific embodiments.

It should be noted that unless otherwise defined, technical or scientific terms used in the present disclosure should have ordinary meanings understood by those of ordinary skill in the art to which the present disclosure belongs. Terms such as "first" and "second" used herein do not denote any order, quantity or importance, but are merely intended to distinguish between different constituents. "Comprising", "containing", and similar words mean that elements or articles appearing before "comprising" or "containing" include the elements or articles and their equivalent elements appearing behind "comprising" or "containing", not excluding any other elements or articles. Terms such as "connected to" and "connected with" are not restricted to physical or mechanical connections, but may also include electrical connections, whether direct or indirect. "Upper", "lower", "left", "right", and the like are used only to indicate a relative positional relationship, and when the absolute position of the described object is changed, the relative positional relationship is also changed accordingly.

Figure 2:
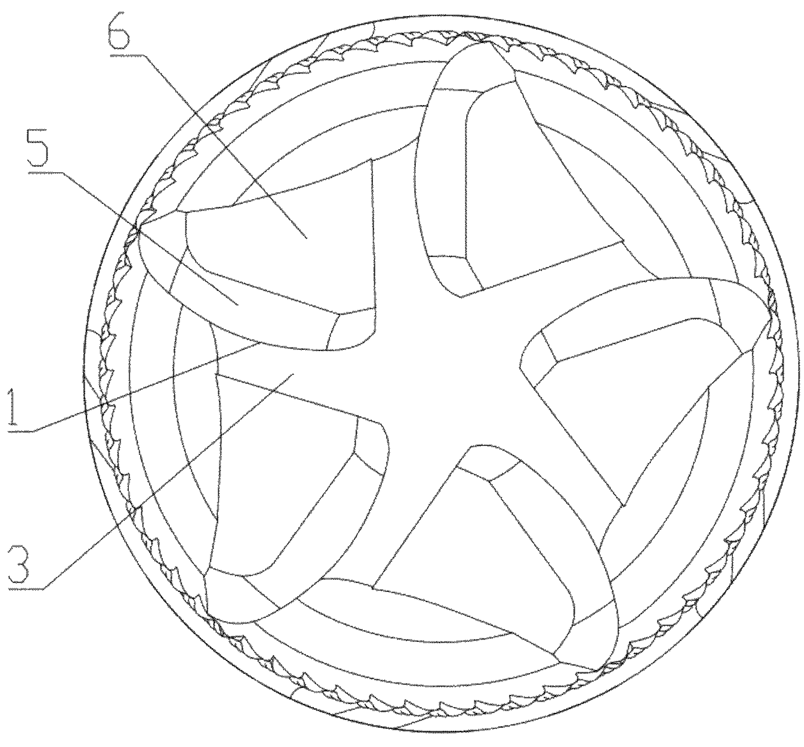
FIG. 2 is a schematic top view of a front cutter head according to the present disclosure.
Figure 3:
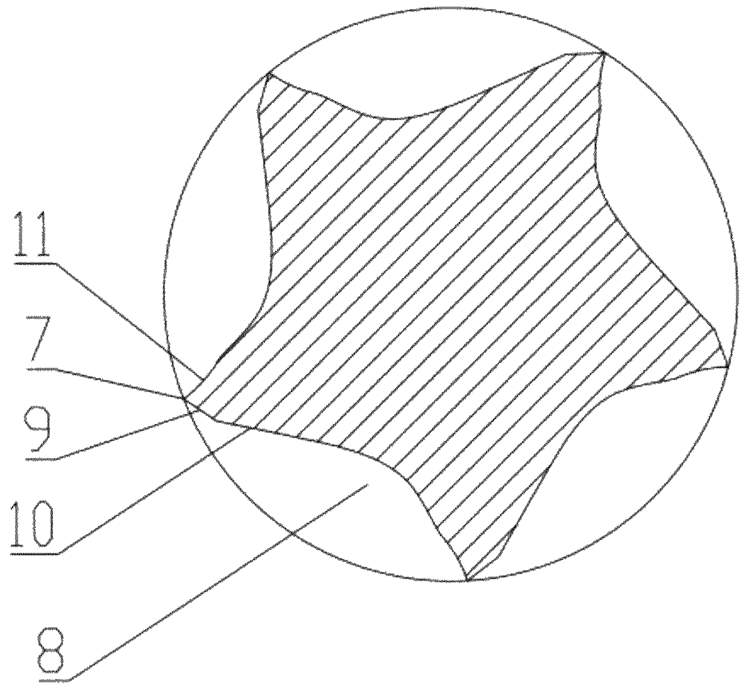
FIG. 3 is a schematic transverse sectional view of a peripheral blade portion according to the present disclosure.
Figure 4:
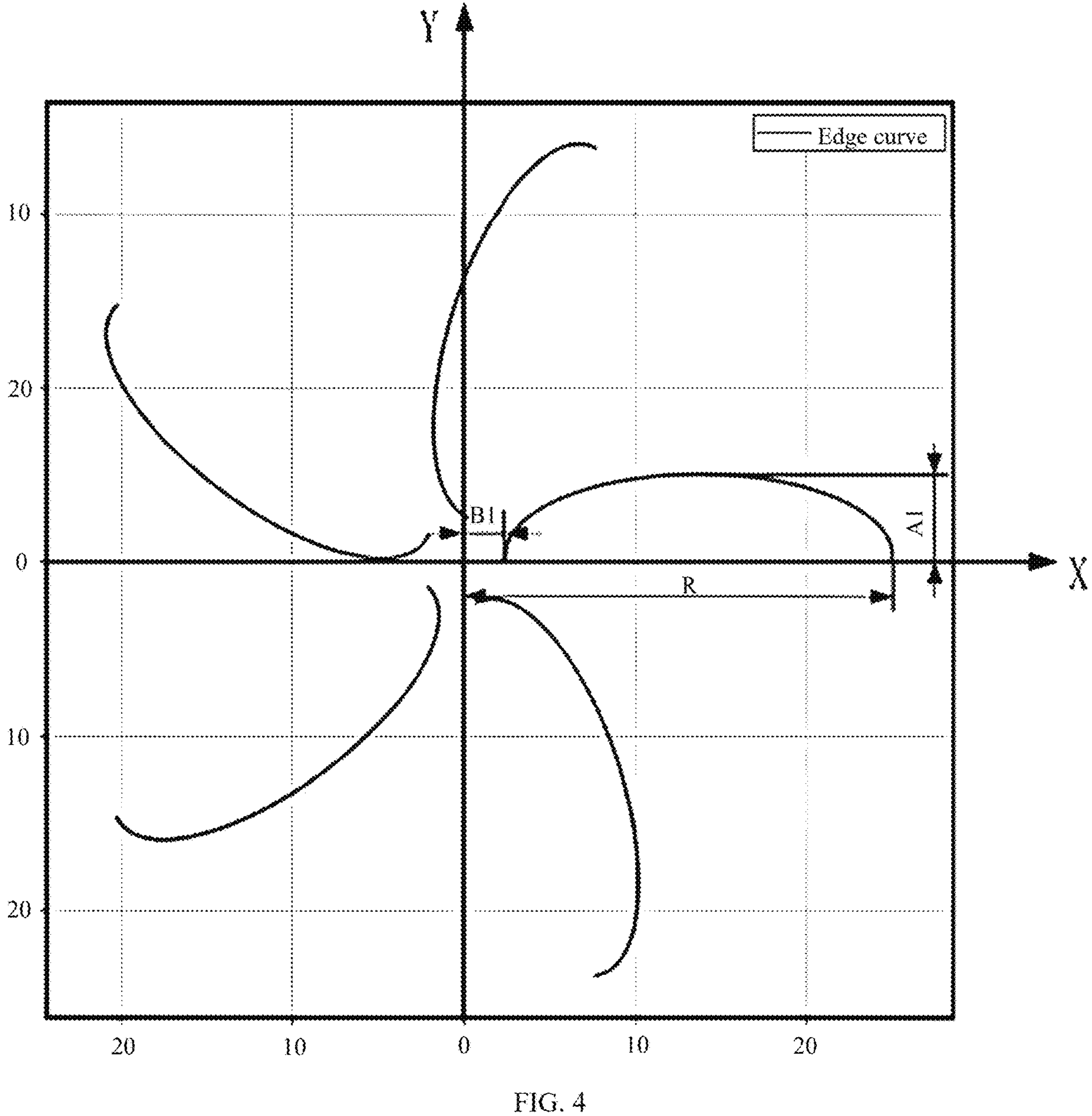
FIG. 4 is a schematic curved distribution diagram of five crescent cutting blades according to the present disclosure.
Figure 5:
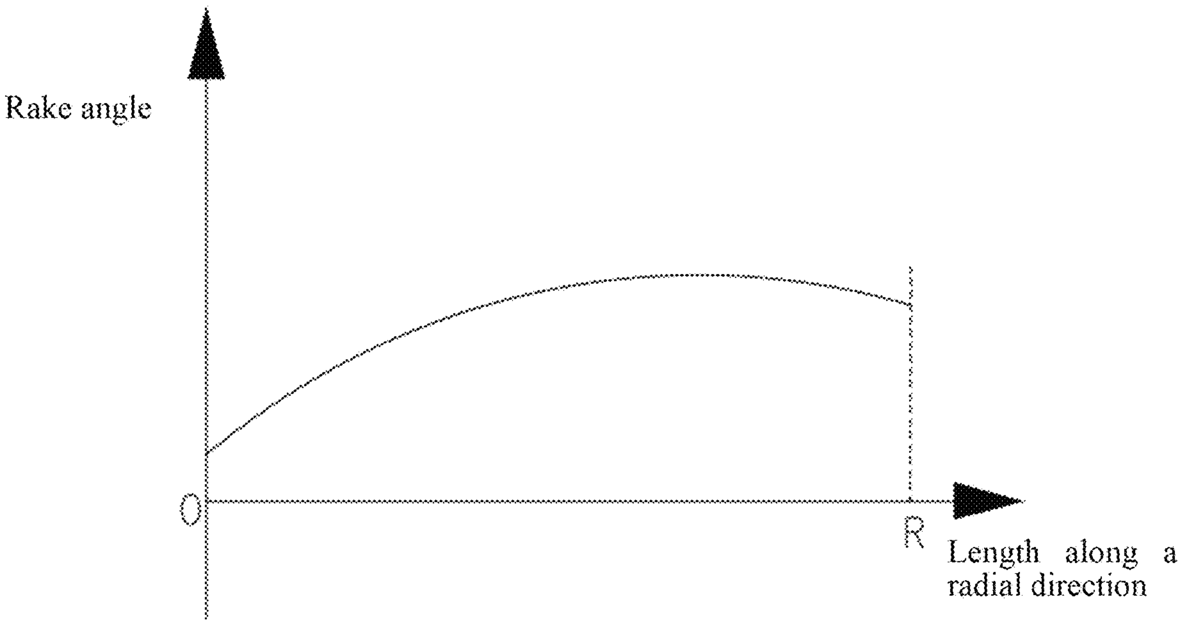
FIG. 5 is a schematic diagram illustrating that a rake angle changes along a radial direction according to the present disclosure.
Figure 6:
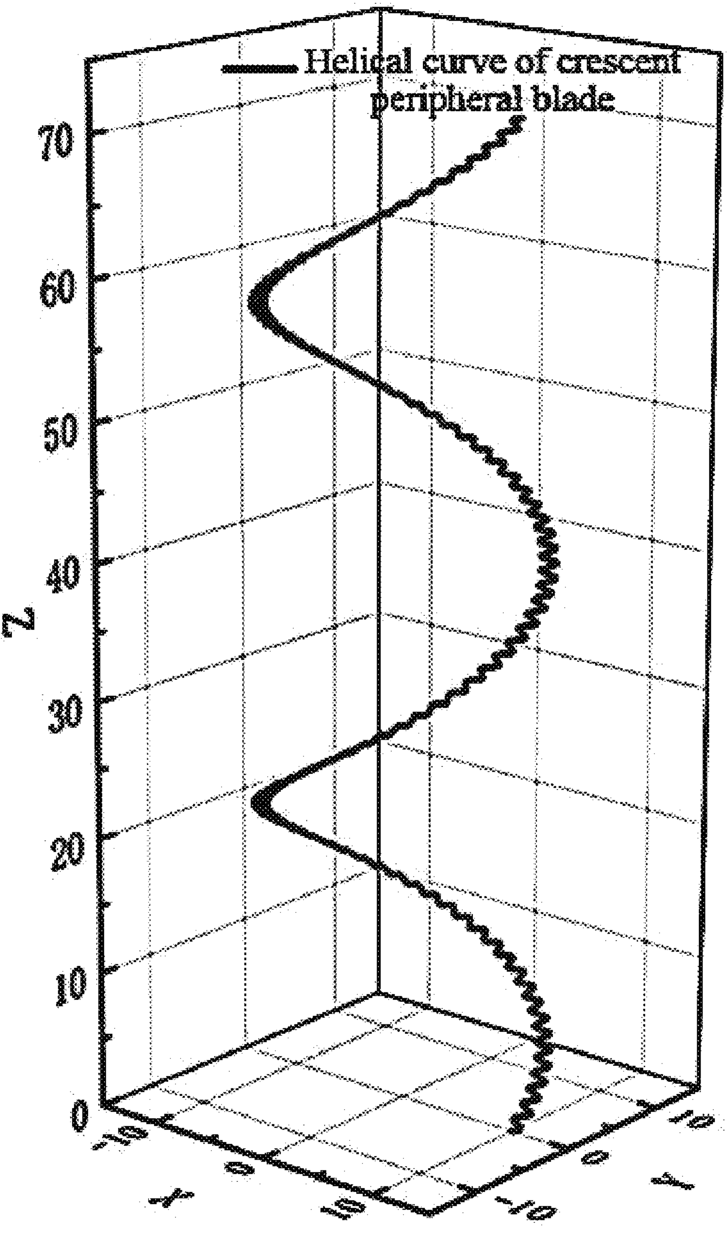
FIG. 6 is a schematic diagram of a helix curve of a crescent peripheral blade according to the present disclosure.

Referring to FIG. 1 to FIG. 6, the present disclosure provides the following embodiments:

Embodiment 1

A crescent-edge hard alloy milling cutter includes front cutter head 100, peripheral blade portion 200, and shank portion 4. A plurality of crescent peripheral blades 7 extending helically toward the front cutter head 100 are provided on the peripheral blade portion 200. A plurality of crescent cutting blades 1 are provided on the front cutter head 100. For example, there are five crescent cutting blades 1 and five crescent peripheral blades 7. The crescent cutting blade 1 and the crescent peripheral blade 7 are in arc transition in pairs. With the crescent cutting blade 1 and the crescent peripheral blade 7, the present disclosure ensures cutting performance of the milling cutter. Moreover, the crescent cutting blade 1 and the crescent peripheral blade 7 are in the arc transition, ensuring smoothness of the milling cutter to cut a metal workpiece.

End chip flute 3 is formed between adjacent crescent cutting blades 1. The end chip flute 3 is configured to evacuate a metal chip generated when the metal workpiece is cut by the crescent cutting blade 1. Two sides of the crescent cutting blade 1 are respectively connected to first flank face 5 and rake face 2 of a curved surface structure. A side of the rake face 2 away from the crescent cutting blade 1 is connected to the end chip flute 3. A side of the first flank face 5 away from the crescent cutting blade 1 is connected to another end chip flute 3 through second flank face 6.

Peripheral-blade chip flute 8 is formed between adjacent crescent peripheral blades 7. The peripheral-blade chip flute 8 is configured to evacuate a metal chip generated when the metal workpiece is cut by the crescent peripheral blade 7. Two sides of the crescent peripheral blade 7 are respectively connected to peripheral-blade rake face 11 and first peripheral-blade flank face 9. A side of the peripheral-blade rake face 11 away from the crescent peripheral blade 7 is connected to the peripheral-blade chip flute 8. A side of the first peripheral-blade flank face 9 away from the crescent peripheral blade 7 is connected to another peripheral-blade chip flute 8 through second peripheral-blade flank face 10.

Embodiment 2

In Embodiment 2, on the basis of Embodiment 1, a structural parameter of the crescent-edge hard alloy milling cutter is disclosed. Specifically, with a center of the front cutter head 100 as an origin O, a plane-coordinate system XOY flush with a transverse section of the front cutter head 100 is established. In an initial state, a curvilinear equation of the crescent cutting blade 1 satisfies the following relation:

$$\begin{cases} x(\theta) = \frac{R}{2} \times (\cos\theta + 1) + B1 \times \frac{\theta}{\pi} \\ y(\theta) = A1 \times \sin\theta \end{cases}$$

where θ is a variation parameter of a curve of the crescent cutting blade 1, and θ∈[0, π]; R is a radius of the front cutter head 100, and R∈[1 mm, 25 mm]; A1 is an amplitude of an edge of the crescent cutting blade 1, and in unit of a micron, and A1∈[0.2,5]; and B1 is a distance from a starting point of the crescent cutting blade 1 to a center of the milling cutter, and B1∈[0.1R, 0.5R].

If θ=0, a coordinate (R, 0) of the curve of the crescent cutting blade 1 is a starting point of the curve of the crescent cutting blade 1. If θ=π, a coordinate (B1, 0) of the curve of the crescent cutting blade 1 is an ending point of the curve of the crescent cutting blade 1. When the θ changes from 0 to π, a complete curve of the crescent cutting blade 1 is drawn.

The plurality of crescent cutting blades 1 in the initial state are respectively rotated by different angles to form a plurality of different crescent cutting blades 1. A curvilinear equation of the finally formed crescent cutting blade 1 satisfies the following relation:

$$\begin{pmatrix} x(\theta)_k \\ y(\theta)_k \end{pmatrix} = \begin{pmatrix} \cos\theta_k & -\sin\theta_k \\ \sin\theta_k & \cos\theta_k \end{pmatrix} \begin{pmatrix} x(\theta) \\ y(\theta) \end{pmatrix}$$

where k represents serial numbers of the different crescent cutting blades 1, and k=1, 2, 3, . . . , N, N representing a total number of crescent cutting blades 1 on the front cutter head 100, $$N \geq 2, N \in N^+, \text{ and } \theta_k = \frac{2\pi k}{N}.$$

Based on the plane-coordinate system XOY, with an axis of the milling cutter as a Z axis, a 3D coordinate system O-XYZ is established. The Z axis takes a direction pointing to the front cutter head 100 as a positive direction. A curvilinear equation of the crescent peripheral blade 7 satisfies the following relation:

$$\begin{cases} x(\theta1) = \left(\frac{R}{2} + A\sin(B \times \theta1)\right) \times \cos\theta1 \\ y(\theta1) = \left(\frac{R}{2} + A\sin(B \times \theta1)\right) \times \sin\theta1 \\ z(\theta1) = \frac{M \times \theta1}{2\pi} \end{cases}$$

where θ1 is a variation parameter of a curve of the crescent peripheral blade 7, and $$\theta 1 \in \left[0, \frac{2\pi H}{M}\right];$$

H is a length of the crescent peripheral blade 7, and H∈[5R,6R]; A is an amplitude of an edge of the crescent peripheral blade 7, is used to determine a height of a crescent shape of the crescent peripheral blade 7, and has a unit of micron, and A∈[0.1,0.5]; B is a frequency of the crescent peripheral blade 7, and is used to determine a number of times that the crescent shape of the crescent peripheral blade 7 appears in one helix period, and $$B \in \left[\sqrt{\frac{2\pi^2 R^2 + M^2}{5}}, 20\sqrt{4\pi^2 R^2 + M}\right];$$

and M is a pitch, and is used to determine an ascending height of a helix, and M∈[0.72πR,3.46πR].

If θ1=0, a coordinate (R, 0, 0) of the curve of the crescent peripheral blade 7 is a starting point of the curve of the crescent peripheral blade 7. If $\theta = \frac{2\pi H}{M}$, a coordinate $$\left(\left(\frac{R}{2} + A * \sin\frac{2\pi H}{M}\right) * \cos\frac{2\pi H}{M}, \left(\frac{R}{2} + A * \sin\left(B^* \frac{2\pi H}{M}\right)\right) * \sin\frac{2\pi H}{M}, H\right)$$

of the curve of the crescent peripheral blade 7 is an ending point of the curve of the crescent peripheral blade 7.

A rake angle changing continuously along a radial direction of the front cutter head 100 is formed between the rake face 2 and the crescent cutting blade 1. The rake angle is minimum at the center of the milling cutter, so as to effectively extend a service life of the crescent cutting blade 1 of the front cutter head 100. The rake angle increases first and then decreases along the radial direction of the front cutter head 100.

Further, the rake angle is maximum at a predetermined position R' in the radius of the front cutter head 100, $$R' \in \left(\frac{R}{2}, \frac{4R}{5}\right).$$

That is, the predetermined position R' is located on the radius of the front cutter head 100. A distance between the predetermined position R' and the center of the milling cutter is 0.5R-0.8R. In a range of 0-R', the rake angle increases along the radial direction of the front cutter head 100 in a manner that an increment decreases progressively, so as to improve a cutting capacity of the crescent cutting blade 1 in cutting, increase surface smoothness, and reduce the problem that secondary machining is required for obvious cutting marks and burrs, thereby improving the machining efficiency. In a range of R'-R, the rake angle decreases along the radial direction of the front cutter head 100 in a manner that a decrement increases progressively, so as to reduce elastic deformation when the chip is cut down, reduce frictional resistance with the rake face 2 when the cut chip flows out, and further extend the service life of the crescent cutting blade 1.

Embodiment 3

In Embodiment 3, on the basis of Embodiment 1, a parameter design method is provided. The parameter design method is applied to design a parameter of the crescent-edge hard alloy milling cutter, and includes the following steps:

S1, a mathematical relation among the amplitude, the frequency, the pitch, a cutting force, a cutting temperature, and chatter is established, specifically:

$$\begin{cases} V(A, B, M) = c1 \times A^{a1} \times B^{b1} \times M^{m1} \\ F(A, B, M) = c2 \times A^{a2} \times B^{b2} \times M^{m2} \\ T(A, B, M) = c3 \times A^{a3} \times B^{b3} \times M^{m3} \end{cases}$$

where V(A,B,M) represents the chatter under the amplitude A, the frequency B and the pitch M, F(A,B,M) represents the cutting force under the amplitude A, the frequency B and the pitch M, T(A,B,M) represents the cutting temperature under the amplitude A, the frequency B and the pitch M, and a1,b1,c1,m1,a2,b2,c2,m2,a3,b3,c3,m3 each are a to-be-determined coefficient.

S2, a working model for a tool and a workpiece is established; a cutting process at different amplitudes A, different frequencies B and different pitches M is simulated while a material characteristic of the workpiece is determined; chatter data, cutting force data and cutting temperature data at the different amplitudes A, the different frequencies B and the different pitches M are acquired through simulated analysis; and the to-be-determined coefficient a1,b1,c1,m1,a2,b2,c2,m2,a3,b3,c3,m3 is determined based on regression analysis.

A finite element method (FEM) in the prior art can be used to establish the working model for the tool and the workpiece, simulate the cutting process at the different amplitudes A, the different frequencies B and the different pitches M while the material characteristic of the workpiece is determined, and acquire the chatter data, the cutting force data and the cutting temperature data at the different amplitudes A, the different frequencies B and the different pitches M through the simulated analysis. Specifically: 1) A geometrical model for the tool and the workpiece is established. Specifically, a modeling tool of computer aided design (CAD) software or FEM software can be used to create the geometrical model for the tool and the workpiece. 2) The material characteristic of the workpiece is defined. Specifically, physical and mechanical properties of a material of the workpiece, such as an elastic modulus, a Poisson's ratio and a thermal conductivity, are selected and defined. 3) A boundary condition and a loading condition are set. The boundary condition is used to simulate a fixed or restricted portion in an actual working environment. The loading condition is used to apply an external force, a cutting speed, a feed rate, and the like. 4) The geometrical model is divided into finite element meshes that are basic computing elements of the FEM. 5) A cutting simulation parameter is set. Specifically, the amplitude A, the frequency B and the pitch M in the cutting process are defined. 6) Finite element simulation is performed to simulate the cutting process of the tool and the workpiece, so as to obtain the chatter data, the cutting force data and the cutting temperature data.

An existing linear regression model can be used to determine the to-be-determined coefficient a1,b1,c1,m1,a2, b2,c2,m2,a3,b3,c3,m3 based on the regression analysis. Specifically: 1) The amplitude A, the frequency B and the pitch M are taken as independent variables, and the corresponding chatter data, cutting force data and the cutting temperature data are taken as target variables. 2) Logarithmic transformation is performed on the independent variables and the target variables. The linear regression model is used to fit transformed data to obtain a regression result. 3) A coefficient in the regression result is converted into the to-be-determined coefficient in the original relation.

S3, a generalized objective function is defined, and an optimal solution for the amplitude A, the frequency B and the pitch M is sought based on a multi-objective optimization algorithm to minimize the generalized objective function.

The generalized objective function is expressed as:

$$\min f(A, B, M) = [V(A, B, M), F(A, B, M), T(A, B, M)]$$

where the optimal solution for the amplitude A, the frequency B and the pitch M is calibrated as an amplitude A*, a frequency B* and a pitch M*; and when the following condition is satisfied, the amplitude A*, the frequency B* and the pitch M* are taken as the optimal solution of the generalized objective function.

There is no solution satisfying:

$$\begin{cases} V(A, B, M) \le V(A^*, B^*, M^*) \\ F(A, B, M) \le F(A^*, B^*, M^*) \\ T(A, B, M) \le T(A^*, B^*, M^*) \end{cases}.$$

There is at least a solution satisfying:

$$\begin{cases} V(A, B, M) < V(A^*, B^*, M^*) \\ F(A, B, M) < F(A^*, B^*, M^*) \\ T(A, B, M) < T(A^*, B^*, M^*) \end{cases}.$$

According to the parameter design method in Embodiment 3, by adjusting the amplitude, the frequency and the pitch of the crescent peripheral blade, force distribution and vibration characteristics in the cutting process are optimized, ensuring reasonable distribution of the cutting force, reducing the chatter, and improving the heat dissipation performance, thereby improving the durability, machining precision and efficiency of the tool, and improving the machining stability and surface quality. By adjusting geometrical parameters of the crescent edge, the parameter design method can be quickly adapted to machining requirements of different materials and working conditions. In combination with the FEA and the multi-objective optimization algorithm, the optimality and practicability of the design are ensured, simplifying the design and manufacture process, and lowering the cost.

All the above equations are converted to a dimensionless basis for pure numerical computation. Each of the foregoing formulas is derived software simulation based on extensive data collection, and closely approximates real-world values. Preset parameters in the equations are set by those skilled in the art according to actual situations.

Some or all of the foregoing embodiments may be implemented by software, hardware, firmware, or any combination thereof. When realized by the software, the embodiments can be performed in a form of a computer program product in whole or in part. Those skilled in the art may be aware that units and algorithm steps in examples described with reference to the embodiments disclosed herein can be implemented as electronic hardware or a combination of computer software and electronic hardware. Whether these functions are implemented by using hardware or software depends on the specific application of the technical solutions and design constraints.

The units described as separate parts may be or may not be physically separate, and parts displayed as units may be or may not be physical units, may be located in one position, or may be distributed on a plurality of network units. Some or all of the units may be selected according to actual needs to achieve the objectives of the solutions of embodiments.

The foregoing descriptions are merely specific implementations of the present disclosure, but are not intended to limit the protection scope of the present disclosure. Any variation or replacement readily figured out by those skilled in the art within the technical scope disclosed in the present disclosure shall fall within the protection scope of the present disclosure.

What is claimed is:

1. A crescent-edge hard alloy milling cutter, comprising a front cutter head, a peripheral blade portion, and a shank portion, wherein a plurality of crescent peripheral blades extending helically toward the front cutter head are provided on the peripheral blade portion; a plurality of crescent cutting blades are provided on the front cutter head; and the crescent cutting blade and the crescent peripheral blade are joined by a continuous arcuate transition surface; based on a plane-coordinate system XOY, with an axis of the crescent-edge hard alloy milling cutter as a Z axis, a three-dimensional (3D) coordinate system O-XYZ is established; the Z axis takes a direction pointing to the front cutter head as a positive direction; and A is an amplitude of an edge of the crescent peripheral blade, is used to determine a height of a crescent shape of the crescent peripheral blade, and is in units of a micron, B is a frequency of the crescent peripheral blade, and is used to determine a number of times that the crescent shape of the crescent peripheral blade appears in one helix period, and M is a pitch, and is used to determine an ascending height of a helix;

with a center of the front cutter head as an origin O, the plane-coordinate system XOY flush with a transverse section of the front cutter head is established; and in an initial state, a curvilinear equation of the crescent cutting blade satisfies the following relation:

$$\begin{cases} x(\theta) = \frac{R}{2} \times (\cos\theta + 1) + B1 \times \frac{\theta}{\pi} \\ y(\theta) = A1 \times \sin\theta \end{cases}$$

wherein θ is a variation parameter of a curve of the crescent cutting blade, and θ∈[0, π]; R is a radius of the front cutter head, and R∈[1 mm, 25 mm]; A1 is an amplitude of an edge of the crescent cutting blade, and in unit of a micron, and A1∈[0.2, 5]; and B1 is a distance from a starting point of the crescent cutting blade to a center of the crescent-edge hard alloy milling cutter, and B1∈[0.1R, 0.5R]; and the plurality of crescent cutting blades in the initial state are respectively rotated by different angles about the axis of the crescent-edge hard alloy milling cutter to obtain and dispose a plurality of crescent cutting blades at mutually different angular positions on the front cutter head; and a curvilinear equation of each of the plurality of different crescent cutting blades satisfies the following relation:

$$\begin{pmatrix} x(\theta)_k \\ y(\theta)_k \end{pmatrix} = \begin{pmatrix} \cos\theta_k & -\sin\theta_k \\ \sin\theta_k & \cos\theta_k \end{pmatrix} \begin{pmatrix} x(\theta) \\ y(\theta) \end{pmatrix}$$

wherein k represents serial numbers of the plurality of different crescent cutting blades, and k=1, 2, 3, . . . , N, N representing a total number of the plurality of crescent cutting blades on the front cutter head, $$N \geq 2,\ N \in N^+,\ \text{and}\ \theta_k = \frac{2\pi k}{N}.$$

2. The crescent-edge hard alloy milling cutter according to claim 1, wherein an end chip flute is formed between adjacent crescent cutting blades of the plurality of crescent cutting blades; two sides of the crescent cutting blade are respectively connected to a first flank face and a rake face, a side of the rake face away from the crescent cutting blade is connected to the end chip flute; and a side of the first flank face away from the crescent cutting blade is connected to another end chip flute through a second flank face.

3. The crescent-edge hard alloy milling cutter according to claim 1, wherein a peripheral-blade chip flute is formed between adjacent crescent peripheral blades of the plurality of crescent peripheral blades; two sides of the crescent peripheral blade are respectively connected to a peripheral-blade rake face and a first peripheral-blade flank face; a side of the peripheral-blade rake face away from the crescent peripheral blade is connected to the peripheral-blade chip flute; and a side of the first peripheral-blade flank face away from the crescent peripheral blade is connected to another peripheral-blade chip flute through a second peripheral-blade flank face.

4. The crescent-edge hard alloy milling cutter according to claim 1, wherein based on the plane-coordinate system XOY, with an axis of the crescent-edge hard alloy milling cutter as a Z axis, a three-dimensional (3D) coordinate system O-XYZ is established; the Z axis takes a direction pointing to the front cutter head as a positive direction; and a curvilinear equation of the crescent peripheral blade satisfies the following relation:

$$\begin{cases} x(\theta 1) = \left(\frac{R}{2} + A\sin(B \times \theta 1)\right) \times \cos\theta 1 \\ y(\theta 1) = \left(\frac{R}{2} + A\sin(B \times \theta 1)\right) \times \sin\theta 1 \\ z(\theta 1) = \frac{M \times \theta 1}{2\pi} \end{cases}$$

wherein θ1 is a variation parameter of a curve of the crescent peripheral blade, and $$\theta 1 \in \left[0,\ \frac{2\pi H}{M}\right];$$

H is a length of the crescent peripheral blade, and H∈[5R, 6R]; A is an amplitude of an edge of the crescent peripheral blade, is used to determine a height of a crescent shape of the crescent peripheral blade, and is in unit of a micron, and A∈[0.1,0.5]; B is a frequency of the crescent peripheral blade, and is used to determine a number of times that the crescent shape of the crescent peripheral blade appears in one helix period, and $$B \in \left[\sqrt{\frac{2\pi^2 R^2 + M^2}{5}},\ 20\sqrt{4\pi^2 R^2 + M}\right];$$

and M is a pitch, and is used to determine an ascending height of a helix, and M∈[0.72πR, 3.46πR].

5. The crescent-edge hard alloy milling cutter according to claim 2, wherein a rake angle changing continuously along a radial direction of the front cutter head is formed between the rake face and the crescent cutting blade; the rake angle is minimum at the center of the crescent-edge hard alloy milling cutter; and the rake angle increases first and then decreases along the radial direction of the front cutter head.

6. The crescent-edge hard alloy milling cutter according to claim 5, wherein the rake angle is maximum at a predetermined position R' in the radius of the front cutter head; in a range of 0-R', the rake angle increases along the radial direction of the front cutter head in a manner that an increment decreases progressively; and in a range of R'-R, the rake angle decreases along the radial direction of the front cutter head in a manner that a decrement increases progressively, and $$R' \in \left(\frac{R}{2},\ \frac{4R}{5}\right).$$

* * * * *